Patented Nov. 17, 1953

2,659,730

UNITED STATES PATENT OFFICE 2,659,730

2'-(4'-LOWER ALKANOYLAMINOBENZAL)- 6 - ACETYLAMINO - HYDRAZINOBENZOTHIA- ZOLE-2

Leon Katz, Cincinnati, Ohio, assignor to Schenley Industries, Inc., New York, N. Y., a corporation of Delaware No Drawing. Application April 12, 1951, Serial No. 220,717

2 Claims. (Cl. 260—305)

This invention relates, in a general sense, to novel organic chemical compounds and methods for synthesizing them, and, in a more particular sense, it is concerned with certain 2-benzalhydrazinobenzothiazoles having substituents at the 6-position of the benzothiazole moiety and at the para position of the benzal nucleus.

The novel group of compounds of the present invention may be represented by the formula:

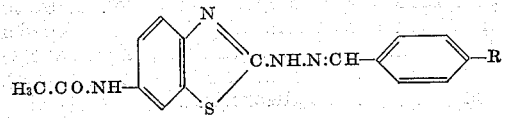

wherein R is a substituent of the group consisting of hydroxyl, lower alkoxy, lower alkoxy-omega-carboxylic acid and simple salts thereof, lower alkanoylamino, di-(lower alkyl)-amino and simple mineral acid addition salts thereof, and lower alkane dicarboxylic acid mono-amido radicals.

It is now well known that certain para substituted benzalthiosemicarbazones, especially p-acetylamino-benzalthiosemicarbazone, are useful against pathogenic micro-organisms of the family Myco, tuberculosis. It is also known that alkylation of the sulfur or nitrogen atoms of these compounds does not enhance their activity, nor is a loss of activity caused by reduction of the carbon-nitrogen double bond.

It is now found that certain members of a group of related substances, namely certain substituted 2-benzalhydrazinobenzothiazoles of the type represented by the above formula wherein R is an alkyl group, are not merely active against Myco. tuberculosis but, in vitro, show even greater activity against certain strains of this organism than is shown by p-acetylaminobenzalthiosemicarbazone. The compounds of this invention are useful as intermediates in the synthesis of substances of the type aforesaid, and in the synthesis of other useful chemical compounds.

The novel compounds of this invention can be synthesized easily, using 2-chlorobenzothiazole as one of the starting materials, by treating this substance, while in a concentrated sulfuric acid solution, with an alkali metal nitrate to introduce a nitro group as a substituent in the 6-position of the molecule, then reducing this nitro product with iron powder and glacial acetic acid to obtain the corresponding 6-amino compound which, when treated with an acetylating agent such as acetyl chloride, yields 2-chloro-6-acetylaminobenzothiazole. This last-mentioned product is converted to the corresponding 2-hydrazino compound by treatment with hydrazine hydrate, then the 2-hydrazino compound is condensed with a para-substituted benzaldehyde in which the substituent is of the group consisting of hydroxyl, lower alkoxy, lower alkoxy-omega-carboxylic acid or a simple salt thereof, lower alkanoylamino, di-(lower alkyl)-amino and simple mineral acid addition salts thereof, and lower alkane dicarboxylic acid mono-amido radicals. These condensation products of 2-hydrazino-6-acethylamino-benzothiazole and the substituted benzaldehyde are the novel products of this invention.

To facilitate a better understanding of the subject matter of this invention, certain examples illustrating application of the principles of the invention to the synthesis of specific compounds herewith follow, but it is to be understood that these examples are provided merely for purposes of illustration, without the intention that the scope of the invention will be limited thereby.

Example 1

Synthesis of 2-chloro-6-nitro-benzothiazole: Into a 2-liter three-necked flask equipped with a sealed stirrer, thermometer, dropping funnel, and ice bath is charged 800 g. of concentrated sulphuric acid and, from the dropping funnel, about 101 g. (0.60 mole) of 2-chlorobenzothiazole is added to the acid at 10–17° C. over a period of one-half hour. A slightly milky solution is obtained which is cooled to 12° C., then 66 g. (0.66 mole) of finely pulverized potassium nitrate is added portion-wise over a one hour period while maintaining the temperature below 18° C. The brownish solution so obtained is stirred an additional quarter hour at 15–18° C. and warmed to 25° C. in a one-half hour period. The temperature then rises spontaneously to about 40° C., after which it begins to fall, and at this point, the clear amber solution is poured into 4 liter of ice and water. The slurry obtained is diluted with water to 6 liter, and the solid which separates is collected on a Büchner funnel, washed with water until the washings are acid free to Congo red, and dried in vacuo at 60° C. overnight. The weight of lemon-colored solid, M. P. 172–180° C., so obtained is about 122 g. (95%). By recrystallization of this product from hot ethanol an 80% recovery of material M. P. 190–91° C., is obtained. The product yields are unaffected when the reaction is carried out using five to ten-fold the quantities specified above.

Synthesis of 2-chloro-6-amino-benzothiazole: Into a 1-liter, three-necked flask, equipped with a stirrer, condenser, Glascol, and thermometer are charged 150 ml. of 95% ethanol, 10 g. (0.166 mole) of glacial acetic acid, 250 g. of water, and 50 g. (0.89 mole) of 100 mesh iron powder. This slurry is stirred and heated to 80–85° C. over a one-half hour period, then about 21.0 g. (0.1 mole) of 2-chloro-6-nitrobenzothiazole is added in small portions over a period of one hour. The dark slurry so obtained is held at 80° C. an additional hour then 200 ml. of 95% ethanol and 10 g. Darco G–60 decolorizing carbon added and the mixture is refluxed an additional one-quarter hour, then it is filtered hot, through a heated funnel, into 250 ml. of water. The filtrate is chilled in an icebox and the separated solid material is filtered off and dried in vacuo at 50°. This material, 2-chloro-6-amino-benzothiazole, M. P. 155–57° C., is obtained in a yield of about 13.8 g. (75%) and it is sufficiently pure to be used without further purification.

Synthesis of 2-chloro-6-acetylamino-benzothiazole: Into a 300-ml. three-necked flask, equipped with a sealed stirrer, dropping funnel, and ice bath, are charged about 18.4 g. (0.1 mole) of 2-chloro-6-amino-benzothiazole and 70 ml. of pyridine. The solution is stirred and, at 10° C., 10.8 g. (0.16 mole) of acetyl chloride is dripped in over a period of twenty minutes, then the reaction mixture is stirred at 0–10° C. for an additional one-half hour period and then poured into 800 ml. of ice and water. The heavy white slurry so obtained is stirred to dissolve the ice and the white solid which separates is collected on a Büchner funnel. The cake is washed with 500 ml. of water and dried in vacuo at 50°. The weight of product, M. P. 118–21° C., is about 21.6 g. (95%). If this product is recrystallized twice by dissolving it in a minimum amount of 95% ethanol, filtering, and adding the filtrate to 40 volumes of hot water, fine white needles are obtained, melting at 131–2° C. Anal.: Calcd. for $C_9H_8ON_2S Cl$: C, 47.47; H, 3.51: N, 12.20. Found: C, 47.56: H, 3.18 N, 12.57.

Synthesis of 2-hydrazino-6-acetylamino-benzothiazole: Into a 600 ml. beaker on a hot plate is placed 150 g. (85%, 2.55 moles) of hydrazine hydrate and the liquid is stirred and heated to boiling, then about 42.5 g. (0.186 mole) of 2-chloro-6-acetylamino-benzothiazole is added quickly. A heavy slurry is formed which is then diluted with a 125 ml. of hot water, held at the boiling point for an additional five minutes, cooled by adding 150 g. of ice, and filtered. The cake is washed with water and dried in vacuo at 50°. The weight of product, M. P. 215–19° C., so obtained is about 38.3 g. (92.7%). A sample, after being recrystallized from aqueous methanol, is found to have a melting point of about 233–5° C. Anal.: Calcd. for $C_9H_{10}ON_4S$: C, 48.64; H, 4.50; N, 25.22. Found: C, 48.90; H, 4.39; N, 24.49.

Condensation of 2-hydrazino-6-acetylamino-benzothiazole with aromatic aldehydes. Into a 250-ml. beaker on a hot plate are charged about 3.0 g. (0.0135 mole) of 2-hydrazino-6-acetyl-amino-benzothiazole and 100 ml. of 25% acetic acid and the suspension is heated to obtain complete solution. To the yellow solution, at the boiling point, about 3.0 g. (0.024 mole) p-hydroxy-benzaldehyde is added and a thick slurry is obtained almost immediately. The slurry is stirred manually for 10 minutes, cooled, filtered, and the cake washed with water. The yield of product, 2'-(4'-hydroxybenzal)-6-acetylamino-hydrazinobenzothiazole-2, M. P. 274.77° C. is about 3.4 g. (77%) and this product, after being recrystallized from 50% aqueous formamide is found to have a melting point of about 279–81° C.

Example 2

The operations described in Example 1 are repeated excepting that, in the condensation step, the p-hydroxybenzaldehyde is replaced with an equimolecular proportion of p-methoxy-benzaldehyde. The product of this condensation reaction, 2'-(4'-methoxy-benzal)-6-acetylamino-hydrazinobenzothiazole-2, M. P. 262–263° C., is obtained in a yield approximately 93% of the theoretical.

Example 3

The operations described in Example 1 are repeated excepting that, in the condensation step, the p-hydroxybenzaldehyde is replaced with an equimolecular proportion of p-formyl-phenoxyacetic acid. The product of this condensation reaction, 2' - (4'-benzal-oxymethylenecarboxylic acid) - 6 - acetylamino-hydrazinobenzothiazole-2, M. P. 296–7° C., is obtained in a yield approximating 84% of the theoretical.

Example 4

The operations described in Example 1 are repeated excepting that, in the condensation step, the p-hydroxybenzaldehyde is replaced by p-acetylamino-benzaldehyde. The product of this condensation reaction, 2'-(4'-acetylamino-benzal) - 6 - acetylamino-hydrazinobenzothiazole-2, M. P. 292.3° C., is obtained in a yield approximating 89% of the theoretical.

Example 5

The operations described in Example 1 are repeated excepting that, in the condensation step, the p-hydroxybenzaldehyde is replaced by p-dimethylamino-benzaldehyde. The product of this condensation reaction, 2'-(4'-dimethyl-aminobenzal) - 6 - acetylamino - hydrazinobenzothiazole-2, M. P. 286.7° C., is obtained in a yield approximating 91% of the theoretical.

Having thus described the subject matter of this invention, what it is desired to secure by Letters Patent is:

1. A novel chemical compound represented by the formula:

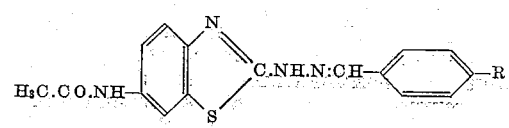

wherein R is a lower alkanoylamino group.

2. A novel chemical compound represented by the formula:

LEON KATZ.

References Cited in the file of this patent

Chemical Abstracts, vol. 41, pp. 754i and 755b citing Pubbl. ist Chim. Bologna, 1943, No. 5, pages 3–13.

Behnisch, The American Review of Tuberculosis, vol. 61, January 1950, pp. 1–7.

Bernstein, Jr., Am. Chem. Soc., vol. 73, pp. 906–912, March 1951, (Address delivered April 9–13, 1950).

Domagk, Naturwissenschaften, vol. 33, November 30, 1946, p. 315.

Hoggarth, British J. Pharmacol (September 1949) 4, pp. 248–253.